UNITED STATES PATENT OFFICE.

OTTO LIEBKNECHT, OF FRANKFORT-ON-THE-MAIN, GERMANY, ASSIGNOR TO ROESSLER & HASSLACHER CHEMICAL COMPANY, OF NEW YORK, N. Y., A CORPORATION OF NEW YORK.

PROCESS OF DEHYDRATING PERBORATES.

1,098,740.      Specification of Letters Patent.      Patented June 2, 1914.

No Drawing.      Application filed November 15, 1912. Serial No. 731,513.

*To all whom it may concern:*

Be it known that I, OTTO LIEBKNECHT, a subject of the Emperor of Germany, residing at Frankfort-on-the-Main, Germany, have invented certain new and useful Improvements in Processes of Dehydrating Perborates.

This invention relates to a process for the dehydration of perborates, such as alkali-perborates, carrying water as a constituent when in the crystallized state, and it particularly refers to a process for the dehydration of the crystals of the well known sodium perborate $NaBO_3.4H_2O$, carrying 10.4% of active oxygen, by means of alcohols, whereby a sodium perborate of higher oxygen content is obtained.

The crystallized sodium-perborate of the formula $NaBO_3.4H_2O$ shows a rather remarkable tendency to decompose and in order to separate the water of crystallization from the compound the only way known at the present consists in heating the same *in vacuo* at a gentle temperature; this process has proved unsatisfactory, however, because of its slowness and the losses of oxygen sustained thereby.

The advantages of my invention are great and important inasmuch as they provide a new and valuable method for producing a perborate, such as sodium perborate, of 14–16% active oxygen, the operation being carried out in a very short time and without any losses of oxygen whatever.

The new process consists for example, in heating one part of crystallized sodium-perborate, $NaBO_3.4H_2O$, with 3–5 parts of an absolute or nearly absolute alcohol to a temperature of about 50–70° C. I prefer to stir the mass during the heating and succeed, in a very short time, in splitting off practically all the water of crystallization; the dehydrated sodium-perborate thus obtained is a very fine powder and may easily be dried when removed from the filter.

As stated above, there is no loss of active oxygen from the sodium-perborate and the process is the more remarkable inasmuch as the sodium-perborate does not exert any oxidizing effect on the alcohols serving as dehydrating agents, for instance, even methyl-alcohol, usually most readily undergoing oxidation, is not affected by the process.

In order to illustrate the new process more fully the following example is given: 500 parts of sodium-perborate, carrying 10.37% of active oxygen, and 2000 parts of absolute, or practically absolute, ethyl alcohol are heated for thirty minutes in a suitable reaction vessel, provided with a stirrer, up to a temperature of about 60° C. The dehydrated sodium-perborate is then obtained from the mass by filtering and subsequent drying in any of the well known ways. If preferable the alcohol adhering to the sodium-perborate may be removed by washing with ether. The sodium-perborate thus finally obtained by the process described above mounts to 327 parts and carries a content of 15.6% of active oxygen.

It is obvious that alcohol, having once passed through the process, carries considerable quantities of water and accordingly will furnish, if used again immediately, a sodium-perborate carrying a content of only 12–14% of active oxygen. By rectifying or treating the alcohol with burned lime or the like well known means, alcohol having once served as a dehydration agent in the process, may be regenerated to its absolute strength to serve again as a dehydrating agent and to thus continuously pass through the process in a cyclic way.

It is evident that the process may be carried on without strictly adhering to the proportions of parts given in the above example, which, as well as the mechanical manipulations of the operation, may be greatly varied without departing from the principle of the invention. Furthermore it is not necessary to carry on the operation exclusively with ethyl alcohol inasmuch as any other alcohol, as for instance methyl alcohol and the like, will serve to achieve the purpose in view.

The merits of the process are not exclusively limited to the sodium-perborate $NaBO_3.4H_2O$, but may also be extended to any of the other existing perborates as for instance to the sodium-perborate.

$$Na_2B_4O_8.10H_2O.$$

Finally it is not necessary to supply the perborate to the process when in the dry state, but wet crystals also, coming directly from the filtering apparatus, may be immediately submitted to the process so that in the latter case the drying of the perborate crystals and the dehydration of the same may be combined into one operation.

Where I use the term "alcohol" in the claims I mean to include diluted as well as absolute or nearly absolute or approximately absolute alcohol and where I use the term "crystallized" I mean to include crystals—whether in the dry or the wet state.

Having described my invention, what I claim and desire to secure by Letters Patent is:

1. A process of dehydrating perborates consisting in dehydrating a crystallized perborate by heating the same in presence of an alcohol.

2. A process of dehydrating perborates consisting in dehydrating a crystallized perborate by heating the same to a temperature of from 50° to 70° C. in presence of an alcohol.

3. A process of dehydrating alkali-perborates consisting in dehydrating a crystallized alkali-perborate by heating the same in presence of an alcohol.

4. A process of dehydrating alkali-perborates consisting in dehydrating a crystallized alkali-perborate by heating the same to a temperature of from 50° to 70° C. in presence of an alcohol.

5. A process of dehydrating sodium-perborates consisting in dehydrating a crystallized sodium-perborate by heating the same in presence of an alcohol.

6. A process of dehydrating sodium-perborates consisting in dehydrating a crystallized sodium-perborate by heating the same to a temperature of from 50° to 70° C. in presence of an alcohol.

In testimony whereof I have signed this specification in the presence of two subscribing witnesses.

OTTO LIEBKNECHT.

Witnesses:
JEAN GRUND,
CARL GRUND.

It is hereby certified that in Letters Patent No. 1,098,740, granted June 2, 1914, upon the application of Otto Liebknecht, of Frankfort-on-the-Main, Germany, for an improvement in "Processes of Dehydrating Perborates," errors appear in the printed specification requiring correction as follows: Page 1, line 69, for the word "mounts" read *amounts;* same page, line 99, strike out the period; and that the said Letters Patent should be read with these corrections therein that the same may conform to the record of the case in the Patent Office.

Signed and sealed this 14th day of July, A. D., 1914.

[SEAL.]
J. T. NEWTON,
*Acting Commissioner of Patents.*